United States Patent [19]

Johnson

[11] Patent Number: 5,680,642
[45] Date of Patent: Oct. 21, 1997

[54] METHOD AND APPARATUS FOR PSEUDO-ALIGNED TRANSFERS OF DATA TO MEMORY WHEREIN A RE-ALIGNMENT IS PERFORMED BASED ON THE DATA BYTE CONTROL HEADER

[75] Inventor: Stephen M. Johnson, Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 82,862

[22] Filed: Jun. 25, 1993

[51] Int. Cl.⁶ .................................................. G06F 13/00
[52] U.S. Cl. .......................... 395/853; 395/885; 395/412; 364/239.3
[58] Field of Search ........................ 395/275, 375, 395/425, 800, 471, 165; 371/10.1; 364/900

[56] References Cited

U.S. PATENT DOCUMENTS

| | | | |
|---|---|---|---|
| 4,408,275 | 10/1983 | Kubo et al. | 364/200 |
| 4,602,350 | 7/1986 | Gray | 364/900 |
| 4,701,923 | 10/1987 | Fukasawa et al. | 371/41 |
| 4,722,050 | 1/1988 | Lee et al. | 364/200 |
| 4,845,664 | 7/1989 | Aichelmann, Jr. et al. | 364/900 |
| 4,860,219 | 8/1989 | Schulz et al. | 364/519 |
| 4,897,799 | 1/1990 | Le Gall et al. | 364/514 |
| 4,932,026 | 6/1990 | Dev et al. | 370/94.1 |
| 5,222,225 | 6/1993 | Groves | 395/425 |
| 5,269,001 | 12/1993 | Guttag | 395/165 |
| 5,287,470 | 2/1994 | Simpson | 395/425 |
| 5,287,537 | 2/1994 | Newmark et al. | 395/800 |
| 5,321,697 | 6/1994 | Fromm et al. | 371/10 |
| 5,491,811 | 2/1996 | Arimilli et al. | 395/471 |
| 5,574,923 | 11/1996 | Herb et al. | 395/800 |

FOREIGN PATENT DOCUMENTS

WO90/10907  9/1990  WIPO ........................ G06F 12/04

OTHER PUBLICATIONS

"Software Interface for Non-Aligned Data Transfers", IBM Technical Disclosure Bulletin, vol. 35, No. 6, Nov. 1992.

*Primary Examiner*—Thomas C. Lee
*Assistant Examiner*—Duo Chen
*Attorney, Agent, or Firm*—Wayne P. Bailey

[57] ABSTRACT

A method and apparatus for pseudo aligned transfers to memory for processors, peripherals and memories. Alignment logic, typically coupled to a peripheral, receives a plurality of data bytes from a processor. The alignment logic uses a control header transferred with the data bytes to determine whether the data bytes require re-alignment. To effect re-alignment, the alignment logic combines, rotates, and masks the data bytes as indicated by the control header.

21 Claims, 5 Drawing Sheets

METHOD AND APPARATUS FOR PSEUDO-ALIGNED TRANSFERS OF DATA TO MEMORY WHEREIN A RE-ALIGNMENT IS PERFORMED BASED ON THE DATA BYTE CONTROL HEADER

BACKGROUND OF THE INVENTION

1. Field of the Invention

The present invention relates in general to transfers of data in computer memory, and in particular to a method and apparatus for pseudo-aligned transfers of data to memory.

2. Description of Related Art

In computer systems, data is often transferred between processors, memories, and peripheral devices via an input/output (I/O) bus. Standardized buses such as the ISA, EISA, or Micro Channel™ buses have long been used in computer systems to provide a common I/O interface to peripherals across different platforms and different processors. However, there are a number of problems associated with data transfers across such buses.

One problem with data transfers across buses involves unaligned transfers of data. Unaligned transfers occur when a block of data bytes is not aligned to a word or double word boundary at the source and/or the destination. Such misalignment can incur significant processor or device overhead in shifting and/or masking the block of bytes during the transfer. For example, unaligned transfers in INTEL® 386 and 486 processors can be 50% to 250% slower than an equivalent aligned transfer of data. Thus, there is a need in the art for a method and apparatus for optimizing unaligned transfers of data to memory.

SUMMARY OF THE INVENTION

To overcome the limitations in the prior art described above, and to overcome other limitations that will become apparent upon reading and understanding the present specification, the present invention discloses a method and apparatus for pseudo-aligned transfers of data to memory. Alignment logic, typically coupled to a peripheral device, receives a plurality of data bytes from a processor. The alignment logic uses a control header transferred with the data bytes to determine whether the data bytes require re-alignment. To effect re-alignment, the alignment logic combines, rotates, and masks the data bytes as indicated by the control header.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be used and structural changes may be made without departing from the scope of the present invention.

Overview

The most efficient INTEL® 386/486 instruction for performing data transfers is "REP MOVSD," which is a mnemonic for the instruction "REPeat MOVe String Double word." For its most efficient operation, this instruction requires that both the source and destination addresses be double word aligned, i.e., aligned on a 32-bit boundary. Byte (8-bit) and word (16-bit) transfers are also allowed and supported, but are less efficient because the I/O bus is 32 bits in width. However, many applications do not assure that data blocks are double word aligned, because they typically access the data blocks as a string of bytes.

The present invention provides for fast aligned transfers of data to memory, even in those cases where the data is unaligned. The present invention provides a method and apparatus for performing pseudo-aligned transfers of data to memory, wherein additional software and hardware perform unaligned data transfers as if they were aligned. The software generates a control header that instructs the hardware in a peripheral device to combine, rotate, and mask the bytes of an unaligned transfer to ensure that the bytes are properly aligned in the peripheral device.

Aligned and Unaligned Transfers

Figure 1:
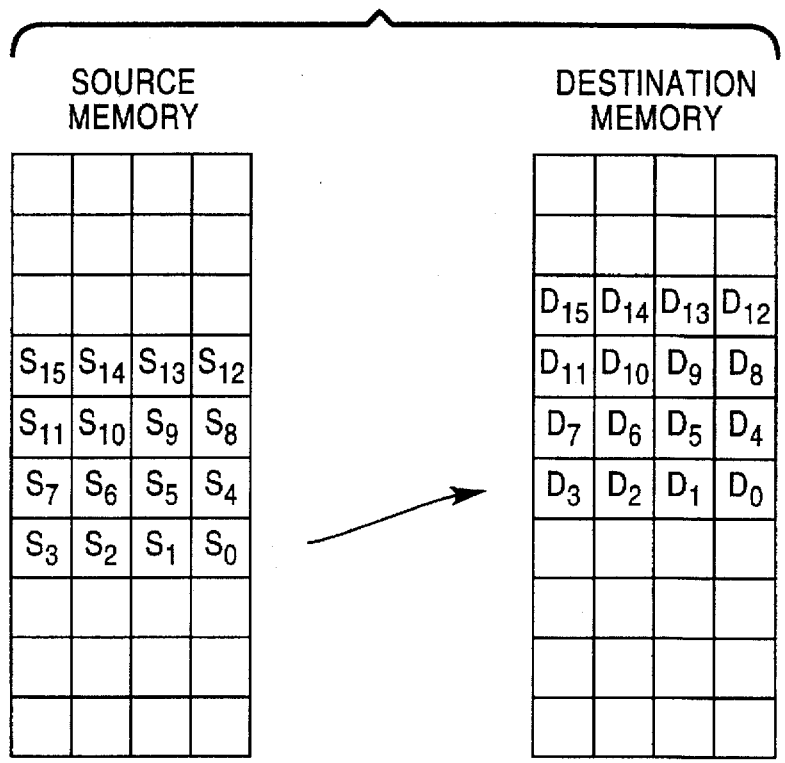
FIG. 1 is an example that illustrates an aligned memory transfer between a processor and video memory.
Figure 2:
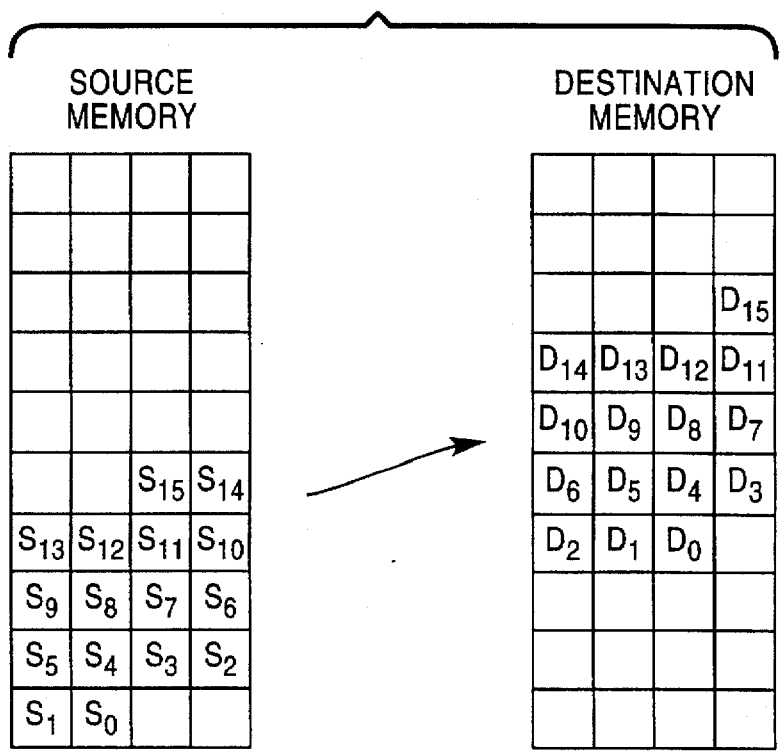
FIG. 2 is an example that illustrates an unaligned memory transfer between a processor and video memory.

FIGS. 1 and 2 are examples that illustrate the difference between aligned and unaligned data transfers. FIG. 1 shows an aligned transfer; and FIG. 2 shows an unaligned transfer. In both FIGS. 1 and 2, each box is a byte of data with double word aligned boundaries indicated by each horizontal group of four bytes.

FIG. 1 illustrates a typical double word aligned transfer of data. As shown, each double word $S_0-S_3$, $S_4-S_7$, $S_8-S_{11}$, and $S_{12}-S_{15}$ in the source memory remains intact as it is transferred to a corresponding double word $D_0-D_3$, $D_4-D_7$, $D_8-D_{11}$, and $D_{12}-D_{15}$ in the destination memory. Thus, this transfer maintains the double word alignment of the data as it is transferred.

FIG. 2 illustrates an example of an unaligned transfer of data. As shown, each byte $S_0-S_{15}$ in the source memory changes its relative double word position as it is transferred to a corresponding byte $D_0-D_{15}$ in the destination memory. In a typical case, combining, rotating and masking of bytes would be required to handle the change in alignment. However, these functions are usually performed by processors in a very inefficient manner.

Hardware Environment

Figure 3:
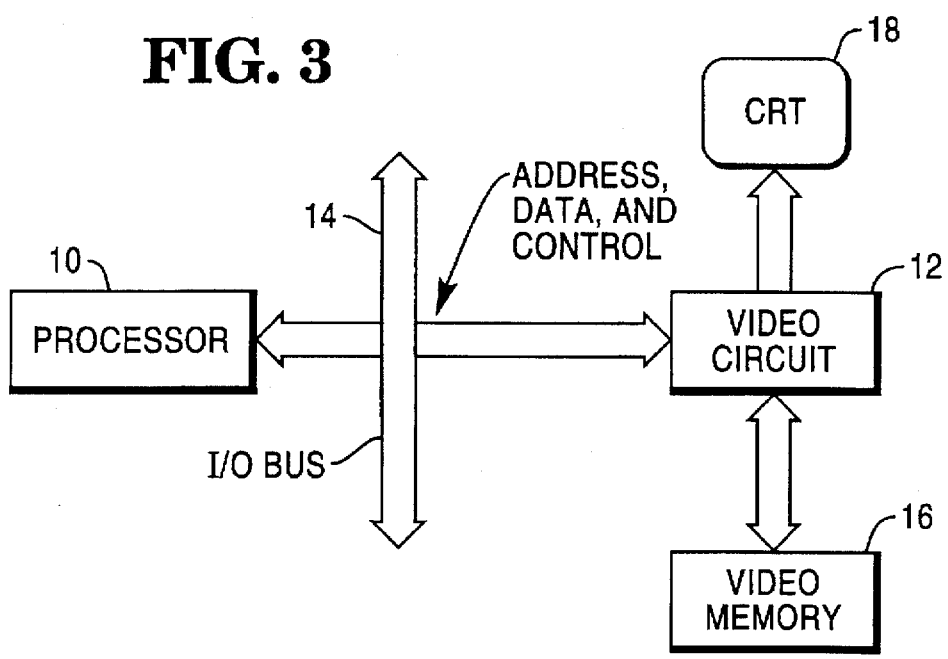
FIG. 3 is a block diagram illustrating the general hardware environment of the present invention.

FIG. 3 is a block diagram illustrating the general hardware environment of the present invention. A processor 10, e.g., an INTEL® 386 or 486 processor, is coupled to a video circuit 12 via an I/O bus 14 that transfers address, data, and control signals between the processor 10 and video circuit 12. The main purpose of the video circuit 12 is to control video memory 16 and CRT 18. The video memory 16 stores data from the processor 10, which can be later written to the CRT 18. The video circuit 12 arbitrates between data transfers from the processor 10 to the video memory 16, and from the video memory 16 to the CRT 18.

Video Circuit

Figure 4:
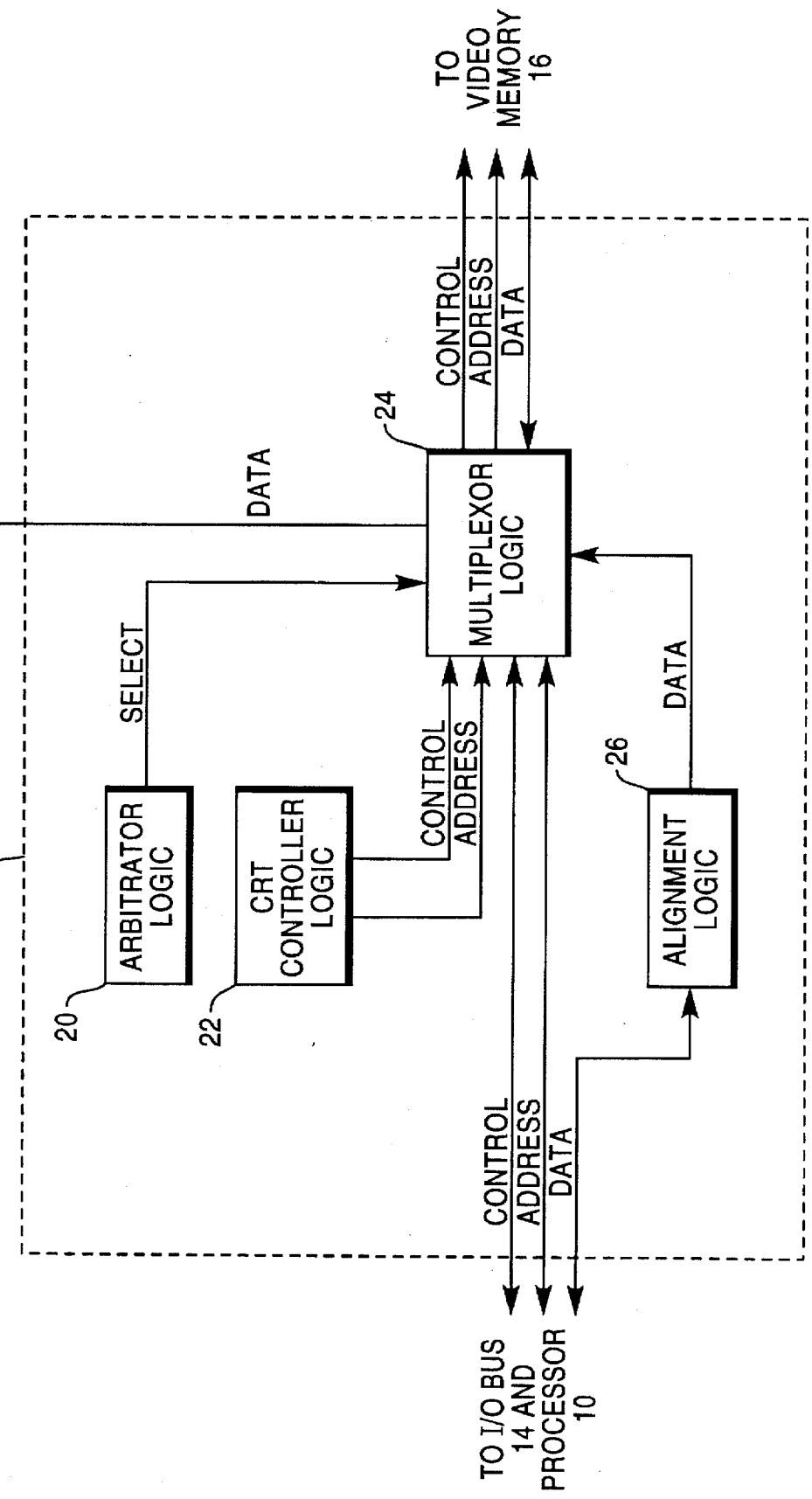
FIG. 4 is a block diagram providing an expanded view of a video circuit in the present invention.

FIG. 4 is a block diagram providing an expanded view of the video circuit 12. The video circuit 12 includes arbitration logic 20, CRT controller logic 22, multiplexor 24, and alignment logic 26. The arbitration logic 20 controls the multiplexor 24 to arbitrate between the CRT controller logic 20 and the processor 10, and thus controls data transfers to and from the processor 10, video memory 16, and CRT 18. The CRT controller logic 22 provides the required addresses to retrieve data from the video memory 16 for display on the CRT 18. The alignment logic 26 ensures that the transfers from the processor 10 are correctly aligned in the video memory 16. With each transfer of data, the alignment logic 26 is used regardless of whether any alignment is actually required, although there is no combining, rotating or masking in an aligned transfer. This requirement that all data transfers go through the alignment logic 24 eliminates any timing problems and simplifies the control logic.

Alignment Logic

Figure 5A:
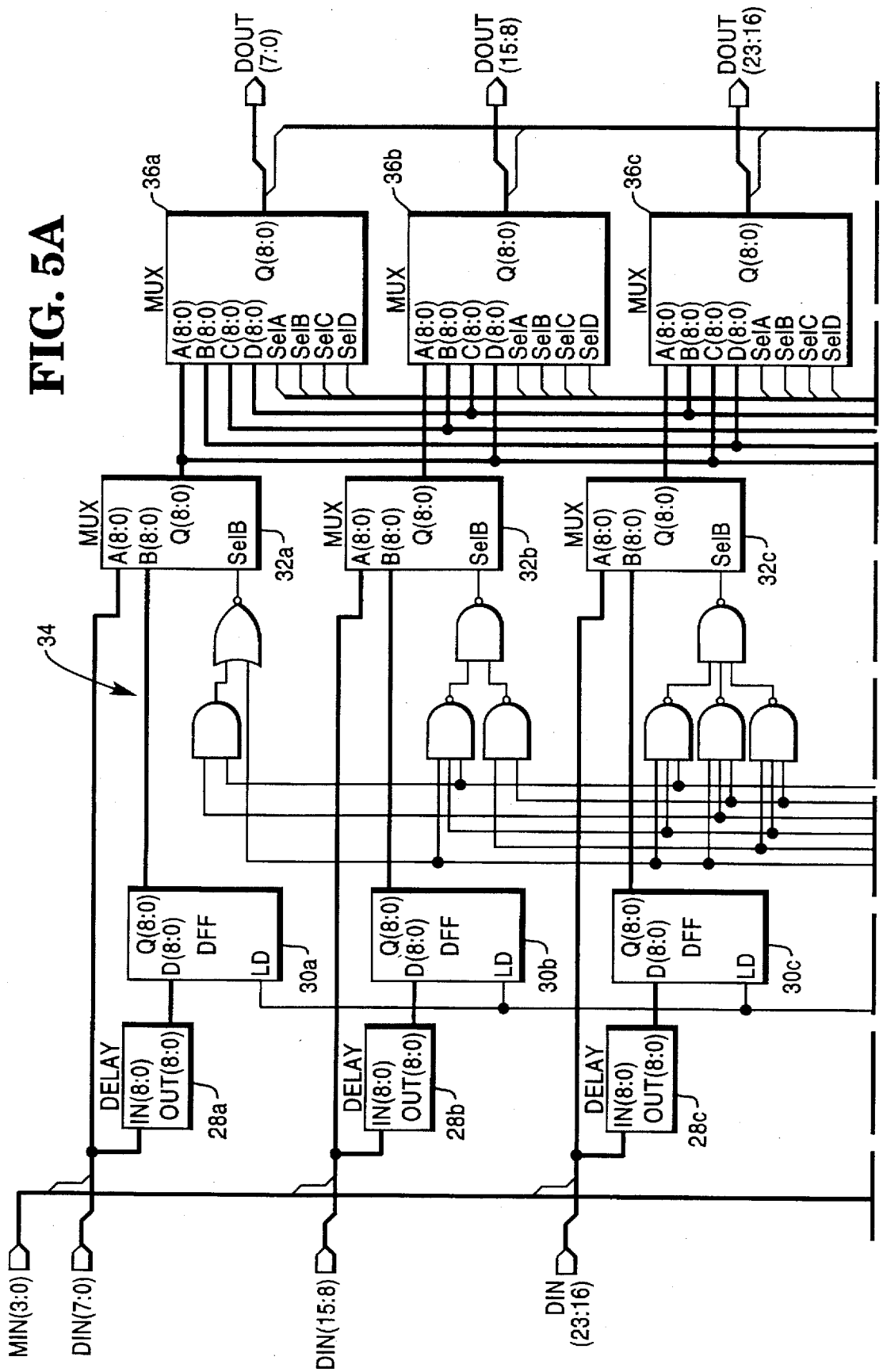
FIGS. 5A and 5B are a block diagram illustrating the components of alignment logic in the present invention.
Figure 5B:
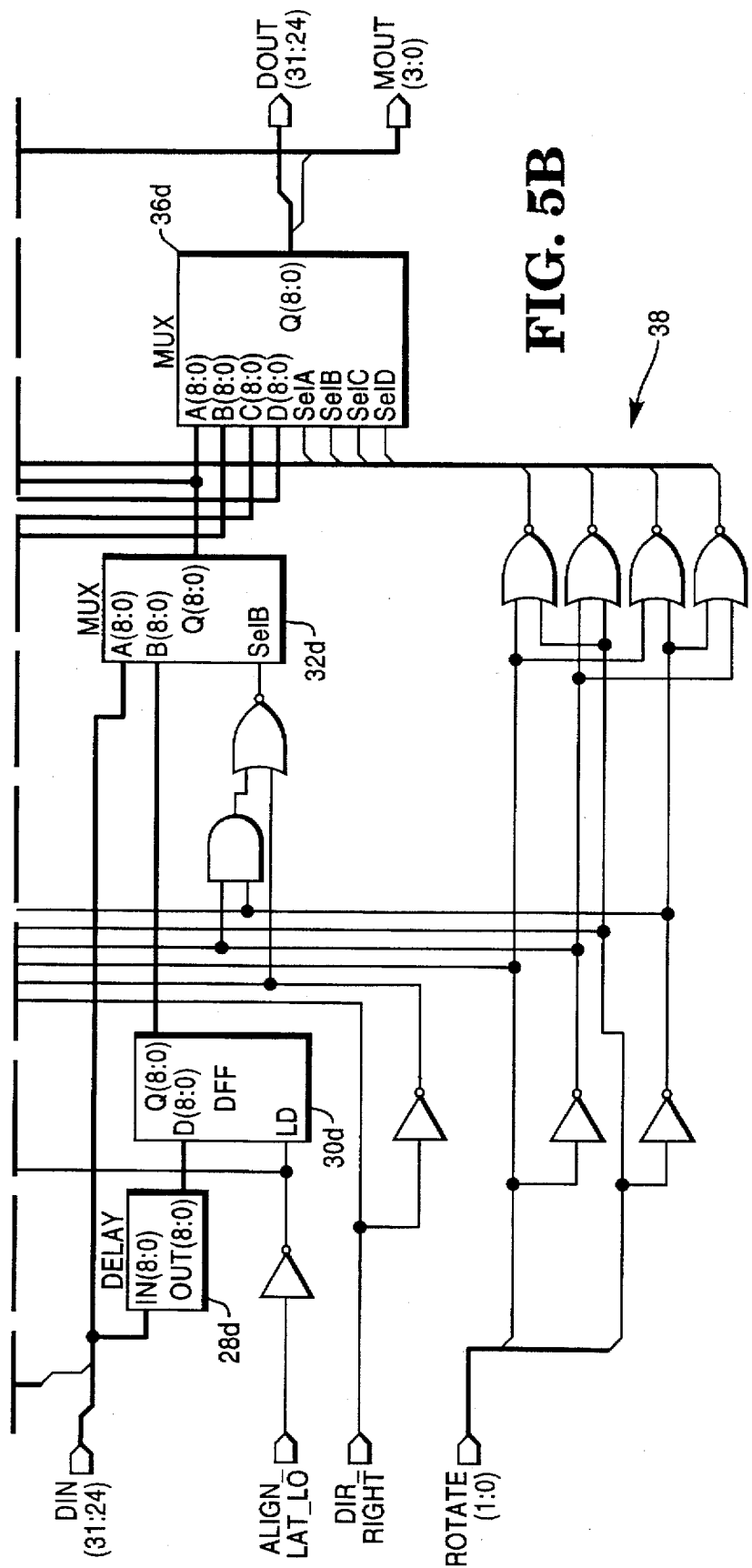

FIGS. 5A and 5B are a block diagram illustrating the components of the alignment logic 26 of the present invention. Data enters the alignment logic 26 on the four Data In (DIN) buses on the left side of FIGS. 5A and 5B, wherein each DIN bus comprises an 8-bit byte of data. Mask information enters the alignment logic 26 at the Mask In (MIN) bus on the left side of FIG. 5A, wherein each of the four signals in the MIN bus comprises a mask bit for the 8-bit byte of data on the corresponding DIN bus indicating whether the byte is part of the desired data or merely an extraneous byte carried along in the pseudo-aligned transfer. Control signals also enter the alignment logic 26 at the ALIGN_LAT_LO, DIR_RIGHT, and ROTATE[1:0] signals on the left side of FIG. 5B.

Blocks 28a–28d are delay blocks for timing purposes. Blocks 30a–30d are 9-bit registers capable of latching each 8-bit byte of data from the respective DIN buses and a single mask bit from the MIN signals, when clocked by the ALIGN-LAT-LO control signal generated by the video circuit 12. Blocks 32a–32d are 2-to-1 multiplexors that select between the current data on the DIN buses and the output of blocks 30a–30d representing the previous data on the DIN buses, thereby allowing the selective combination of data bytes from two sequential double words into an output double word. The selection logic 34 for the blocks 32a–32d consists of NAND and NOR gates driven by the DIR_RIGHT and ROTATE[1:0] control signals as described by the boolean logic in Tables IA-ID. Blocks 36a–36d are 9-bit registers that may be loaded from the outputs of any one of the four multiplexors 32a–32d to rotate the bytes within the output double word. The selection logic 38 for the blocks 36a–36d consists of NOR gates driven by the ROTATE[1:0] control signals as described by the boolean logic in Table II. The selection logic 38 for blocks 36a–36d perform the "barrel shifting" functions, wherein the bytes from each block 32a–32d may be stored in any of the blocks 36a–36d. The ROTATE[1:0] signals indicate the rotation of bytes, i.e., which bytes from blocks 32a–32d should be stored in each of the blocks 36a–36d.

Data exits the alignment logic 26 at the four Data Out (DOUT) buses on the right side of FIGS. 5A and 5B, wherein each DOUT bus comprises an 8-bit byte of data. Mask information also exits the alignment logic 26 at the Mask Out (MOUT) bus on the right side of FIG. 5B, wherein each of the four signals in the MOUT bus indicates whether the 8-bit byte of data on the corresponding DOUT bus should be stored in the video memory 16.

Software Driver Module

Figure 6:
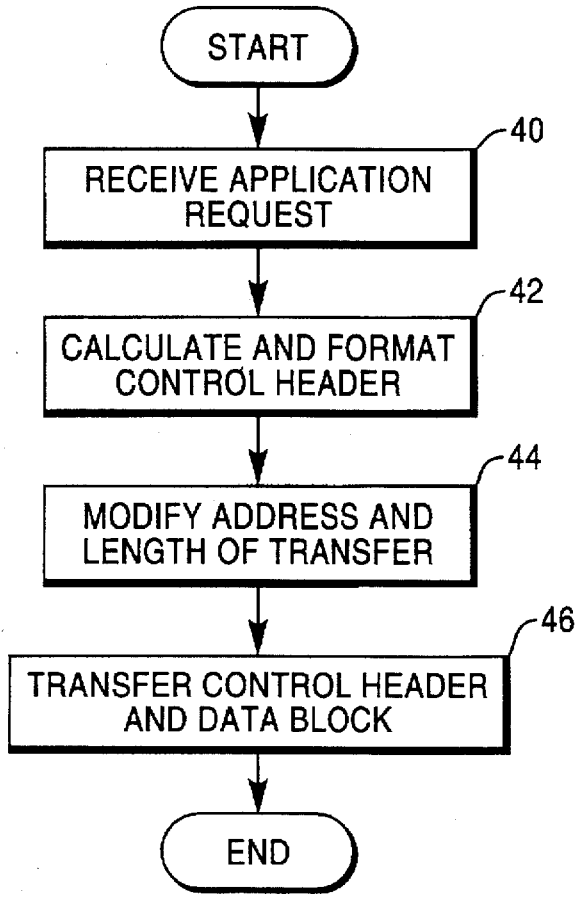
FIG. 6 is a block diagram illustrating the logic used by a software driver module in the present invention.

FIG. 6 is a block diagram illustrating the logic used by the software driver module of the present invention. The software driver module is executed on the processor 10, and controls the pseudo-aligned transfer of data from the processor 10. Block 40 represents the driver module receiving an application request to move a block of data from the processor 10 to the video memory 16, wherein the block is identified by its starting byte address and byte length.

Block 42 represents the driver module calculating and formatting a control header for the transfer containing the source address, destination address, byte length, and alignment control words. Each alignment control word comprises seven bits representing the ROTATE[1:0], DIR-RIGHT, and MIN[3:0] signals for a corresponding double word. As described above, the ROTATE[1:0], DIR_RIGHT, and MIN [3:0] bits in the control header inform the alignment logic 26 of the true nature of the transfer, i.e., whether the bytes should be rotated, the direction of the rotation, and the masking of extraneous bytes. For example, the transfer in FIG. 2 would transfer five sequential double words, and would require a rotation of one byte to the right. Moreover, the two extraneous bytes to the left of $S_{15}$ and the two extraneous bytes to the right of $S_0$ would be masked.

Block 44 represents the driver module modifying the source address, destination address, and byte length presented to the processor 10 to ensure that aligned transfers are performed. Block 46 represents the driver module instructing the processor 10 to transfer the control header and the pseudo-aligned data block to the video circuit 12.

The video circuit 12 includes state machines and FIFOs that buffer up transfers from the processor 10 and then drive the DIN and MIN buses, as well as the ALIGN_LAT_LO, DIR_RIGHT, and ROTATE[1:0] control signals into the alignment logic 26. The design of such state machines and FIFOs are well known in the art, and thus are not described further herein.

Conclusion

In summary, the present invention discloses a method and apparatus for pseudo-aligned transfers of data to memory. Alignment logic, typically coupled to a peripheral device, receives a plurality of data bytes from a processor. The alignment logic uses a control header transferred with the data bytes to determine whether the data bytes require re-alignment. To effect re-alignment, the alignment logic combines, rotates, and masks the data bytes as indicated by the control header.

The foregoing description of the preferred embodiment of the present invention has been presented only for the purposes of illustration and description. The foregoing description is not intended to be exhaustive or to limit the invention to the precise form disclosed. Many modifications and variations are possible in light of the teaching herein. For example, the following paragraphs describe some alternatives in accomplishing the same invention.

Those skilled in the art will recognize that the present invention is applicable to any device that has a memory and is not limited to video controllers. The video controller cited in the present specification is for illustrative purposes only and is not intended to be exhaustive or to limit the invention to the precise form disclosed.

Those skilled in the art will recognize that the present invention is applicable to systems with different configurations of devices and components. The example configurations of devices and components cited in the present specification are for illustrative purposes only and are not intended to be exhaustive or to limit the invention to the precise form disclosed.

Those skilled in the art will recognize that the present invention is applicable to I/O buses of different bit widths. The bit widths cited in the present specification are for illustrative purposes only and are not intended to be exhaustive or to limit the invention to the precise form disclosed.

Those skilled in the art will recognize that the present invention is applicable to different processors with different instruction sets. The processors and instruction sets cited in the present specification are for illustrative purposes only and are not intended to be exhaustive or to limit the invention to the precise form disclosed.

It is intended that the scope of the invention be limited not by this detailed description, but rather by the claims appended hereto.

TABLE IA

SEL = +DIR_RIGHT NOR (-ROTATE[0] AND -ROTATE[1])
BLOCK 32A = (DIN[7:0] AND -SEL) OR (BLOCK 30A AND +SEL)

TABLE IB

SEL = (+DIR_RIGHT NAND +ROTATE[0] NAND
-ROTATE[1]) NAND (+ROTATE[1]
NAND -DIR_RIGHT)
BLOCK 32B = (DIN[15:8] AND -SEL) OR (BLOCK 30B AND +SEL)

TABLE IC

SEL = (-ROTATE[1] NAND +ROTATE[0] NAND
+DIR_RIGHT) NAND
(+ROTATE[1] NAND -ROTATE[0] NAND
+DIR_RIGHT) NAND
(+ROTATE[1] NAND +ROTATE[0] NAND
+DIR_RIGHT)
BLOCK 32C = (DIN[23:16] AND -SEL) OR (BLOCK 30C AND +SEL)

TABLE ID

SEL = (-DIR_RIGHT NOR (-ROTATE[1] AND
-ROTATE[0]))
BLOCK-32D = (DIN[31:24] AND -SEL) OR (BLOCK 30D AND +SEL)

TABLE II

SEL[0] = +ROTATE[0] NOR +ROTATE[1]
SEL[1] = -ROTATE[0] NOR +ROTATE[1]
SEL[2] = +ROTATE[0] NOR -ROTATE[1]
SEL[3] = -ROTATE[0] NOR -ROTATE[1]
BLOCK 36A = (BLOCK 32A AND SEL[0]) OR (BLOCK 32B AND
SEL[1]) OR (BLOCK 32C AND SEL[2]) OR (BLOCK
32D AND SEL[3])
BLOCK 36B = (BLOCK 32B AND SEL[0]) OR (BLOCK 32C AND
SEL[1]) OR (BLOCK 32D AND SEL[2]) OR (BLOCK
32A AND SEL[3])
BLOCK 36C = (BLOCK 32C AND SEL[0]) OR (BLOCK 32D AND
SEL[1]) OR (BLOCK 32A AND SEL[2]) OR (BLOCK
32B AND SEL[3])
BLOCK 36D = (BLOCK 32D AND SEL[0]) OR (BLOCK 32A AND
SEL[1]) OR (BLOCK 32B AND SEL[2]) OR (BLOCK
32C AND SEL[3])

What is claimed is:

1. A computer system comprising:
    a processor comprising means for transferring a plurality of data bytes to a peripheral device via an input/output bus and means for formatting and transmitting a control header for the data bytes, said control header having alignment information regarding the data bytes; and
    alignment means, coupled to the peripheral device, for receiving the transferred data bytes from the processor, for determining whether the transferred data bytes require re-alignment, and for aligning the transferred data bytes, based on the control header, to effect the re-alignment.

2. The invention as set forth in claim 1, wherein the alignment means comprises:
    a first circuit for storing the transferred data bytes received from the processor;
    a second circuit for creating an aligned group of data bytes by selectively combining the data bytes currently being transferred by the processor and the data bytes previously transferred by the processor and stored in the first circuit; and
    a third circuit for selectively repositioning the aligned group of data bytes, so that the data bytes are correctly positioned within the aligned group.

3. The invention as set forth in claim 2, wherein the first circuit comprises a plurality of registers.

4. The invention as set forth in claim 2, wherein the second circuit comprises a plurality of multiplexors.

5. The invention as set forth in claim 2, wherein the third circuit comprises a plurality of multiplexors.

6. The invention as set forth in claim 5, wherein the third circuit comprises a plurality of barrel shift registers.

7. The computer system of claim 1, further comprising a buffer coupled to the alignment means for storing the re-aligned data.

8. The computer system of claim 7, further comprising a computer display for displaying the re-aligned data.

9. A computer system, comprising:
    a processor comprising means for transferring a plurality of data bytes to a peripheral device via an input/output bus and means for formatting and transmitting a control header for the data bytes; and
    alignment means, coupled to the peripheral device, for receiving the transferred data bytes from the processor, for determining whether the transferred data bytes require re-alignment, and for aligning the transferred data bytes, based on the control header, to effect the re-alignment, wherein the control header comprises rotation and direction information for the transferred data; and the alignment means further comprising means for interpreting the control header for the transferred data bytes, wherein the rotation and direction information directs the operation of the means for aligning.

10. The invention as set forth in claim 9, wherein the control header further comprises masking information, and the alignment means further comprises means for masking the transferred data bytes according to the masking information.

11. A method of transferring data in a computer system, comprising the steps of:
    transferring a plurality of data bytes from a processor to a peripheral device via an input/output bus;
    formatting and transmitting a control header for the data bytes, said control header having alignment information regarding the data bytes; and
    aligning the transferred data bytes, comprising the steps of receiving the transferred data bytes from the processor, determining whether the transferred data bytes require re-alignment, and aligning the transferred data bytes based on the control header to effect the re-alignment.

12. The invention as set forth in claim 11, wherein the aligning step comprises the steps of:

creating an aligned group of data bytes by selectively combining the data bytes currently being transferred by the processor and the data bytes previously transferred by the processor; and selectively repositioning the aligned group of data bytes, so that the data bytes are correctly positioned within the aligned group.

13. A method of transferring data in a computer system, comprising the steps of:

transferring a plurality of data bytes from a processor to a peripheral device via an input/output bus;

formatting and transmitting a control header for the data bytes; and aligning the transferred data bytes, comprising the steps of receiving the transferred data bytes from the processor, determining whether the transferred data bytes require re-alignment, and aligning the transferred data bytes based on the control header to effect the re-alignment, wherein the control header comprises rotation and direction information for the transferred data; and the aligning step further comprising the step of interpreting the control header for the transferred data bytes, wherein the rotation and direction information directs the operation of a combining and rotating step.

14. The invention as set forth in claim 13, wherein the control header further comprises masking information, and the aligning step further comprises the step of masking the transferred data bytes according to the masking information.

15. A method of transferring data from a processor to a peripheral device in a computer system, comprising the steps of:

(a) transferring a first group of data bytes from the processor to the peripheral device;

(b) transferring a second group of data bytes from the processor to the peripheral device;

(c) selectively combining data bytes from the first group with data bytes from the second group to create a third group of data bytes aligned to a specified boundary; and (d) selectively repositioning the data bytes within the third group of data so that the data bytes are correctly positioned within the specified boundary, wherein:

(1) the transferring steps (a) and (b) each further comprise the step of formatting and transmitting rotation and direction information for the first and second groups of data bytes;

(2) the selectively combining step (c) further comprises the step of interpreting the rotation and direction information for the first and second groups to determine how to combine the data bytes from the first and second groups to create a third group of data bytes; and (3) the selectively rotating step (d) further comprises the step of interpreting the rotation and direction information for the first and second groups to determine how to rotate the data bytes within the third group of data bytes, so that the data bytes are correctly positioned therein.

16. The invention as set forth in claim 15, wherein:

(1) the transferring steps (a) and (b) each further comprise the step of formatting and transmitting masking information for the first and second groups of data bytes; and (2) the invention further comprising the step of masking the third group of data bytes according to the masking information.

17. A method for re-aligning data, comprising the steps of:

receiving a request to transfer a block of data;

generating a control header having alignment information regarding the block of data;

transmitting the control header and block of data to a peripheral device; and re-aligning the block of data, based upon the control header alignment information, prior to receipt by the peripheral device.

18. The method of claim 17, wherein the alignment information comprises byte ordering information.

19. The method of claim 17, wherein the receiving and generating steps are performed by software, and the re-aligning step is performed by a hardware device coupled to the peripheral device.

20. The method of claim 17, further including the step of modifying the block of data's starting address.

21. The method of claim 20, wherein the modified starting address is a word boundary address.

* * * * *